United States Patent
Yano et al.

(10) Patent No.: US 6,701,372 B2
(45) Date of Patent: Mar. 2, 2004

(54) DATA COMMUNICATION APPARATUS AND METHOD

(75) Inventors: Koichi Yano, Kawasaki (JP); Hiroaki Sato, Kawasaki (JP); Tomohiko Shimoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/137,800

(22) Filed: Aug. 20, 1998

(65) Prior Publication Data

US 2003/0037158 A1 Feb. 20, 2003

(30) Foreign Application Priority Data

| Aug. 22, 1997 | (JP) | ............................................ 9-226828 |
| Jan. 21, 1998 | (JP) | .......................................... 10-009769 |
| Apr. 21, 1998 | (JP) | .......................................... 10-111022 |

(51) Int. Cl.$^7$ .............................................. G06F 15/16
(52) U.S. Cl. ........................ 709/232; 709/231; 370/232; 370/231
(58) Field of Search .............................. 709/231–235, 709/219, 239, 233, 232, 216; 370/232, 231, 233

(56) References Cited

U.S. PATENT DOCUMENTS

| 5,367,523 A | * | 11/1994 | Chang et al. ................ 370/235 |
| 5,627,970 A | * | 5/1997 | Keshav ........................ 370/232 |
| 5,701,292 A | * | 12/1997 | Chiussi et al. .............. 370/232 |
| 5,745,696 A | * | 4/1998 | Mendelson et al. ......... 709/233 |
| 5,819,048 A | * | 10/1998 | Okazaki et al. ............. 709/233 |
| 5,848,266 A | * | 12/1998 | Scheurich .................... 713/503 |
| 5,872,777 A | * | 2/1999 | Brailean et al. ............. 370/349 |
| 5,935,213 A | * | 8/1999 | Rananand et al. .......... 709/234 |
| 6,047,328 A | * | 4/2000 | Charny et al. .............. 709/233 |
| 6,052,734 A | * | 4/2000 | Ito et al. ..................... 709/235 |
| 6,081,843 A | * | 6/2000 | Kilkki et al. ................ 709/232 |
| 6,212,240 B1 | * | 4/2001 | Scheibel et al. ............ 370/468 |
| 6,215,772 B1 | * | 4/2001 | Verma ......................... 370/231 |
| 6,219,343 B1 | * | 4/2001 | Honkasalo et al. ......... 370/335 |
| 6,266,346 B1 | * | 7/2001 | Takeda et al. ............... 370/468 |
| 6,292,834 B1 | * | 9/2001 | Ravi et al. ................... 709/233 |
| 6,310,857 B1 | * | 10/2001 | Duffield et al. ............. 370/232 |

* cited by examiner

*Primary Examiner*—Ario Etienne
*Assistant Examiner*—Abdullahi Elmi Salad
(74) *Attorney, Agent, or Firm*—Morgan & Finnegan, L.L.P.

(57) ABSTRACT

This invention can make data communications at an optimal transfer rate on the basis of the unarrived data volume on a network between two end terminals. For this purpose, a transmitting terminal (1-1) adds sequence number information to data generated by a data generator (1-11), and transmits the data to a receiving terminal (1-2) via a data transmitter (1-12). Since the receiving terminal (1-2) transmits data including the sequence number in the received data, the transmitting terminal determines that data (buffer capacity) corresponding to the difference between the current sequence number and the received sequence number remain on the network and calculates that volume using a network buffer data volume calculator (1-14) The transmitting terminal determines the transmission rate on the basis of the calculation result, and controls the data transmitter (1-12) to transfer data at that transmission rate.

32 Claims, 15 Drawing Sheets

FIG. 4

| TRANSMISSION SEQUENCE NUMBER | 1010 |
|---|---|
| TRANSMISSION TIME | 1997:10:11:15:14:12.783 |
| PACKET SIZE | 500 |
| DATA | ............ |

FIG. 5

| RECEPTION SEQUENCE NUMBER | 1002 |
|---|---|
| RECEPTION TIME | 1997:10:11:15:14:13.302 |
| RECEPTION RATE | 23402 |
| ............ | ............ |

FIG. 10

| RECEPTION SEQUENCE NUMBER | 1002 |
|---|---|
| DATA TRANSMISSION TIME | 1997:4:15:10:11:12.988 |
| DATA RECEPTION TIME | 1997:4:15:10:11:13.302 |
| RECEIVER REPORT TRANSMISSSION TIME | 1997:4:15:10:11:13.512 |
| RECEPTION RATE | 23402 |
| ............ | ............ |

FIG. 11

| VERSION | PRESENCE / ABSENCE OF PAD | NUMBER OF RECEIVER BLOCKS | | |
|---|---|---|---|---|
| | | | PACKET TYPE : 201 | LENGTH |

| | |
|---|---|
| SYNC SOURCE IDENTIFIER OF SENDER | |
| SYNC SOURCE IDENTIFIER OF FIRST SOURCE | |

USED FOR CALCULATING RECEPTION RATE:
| LOSS RATE L | TOTAL NUMBER OF LOST PACKETS |
|---|---|
| RECEIVED MAXIMUM SEQUENCE NUMBER | (Sn) |

ARRIVE INTERVAL JITTER

USED FOR CALCULATING RTT:
| TIME OF LAST SENDER REPORT PACKET | $(T_{s1})$ |
|---|---|
| TIME FROM LAST SENDER REPORT PACKET | $(T_{r2} - T_{r1})$ |

SYNC SOURCE IDENTIFIER OF SECOND SOURCE

| LOSS RATE | TOTAL NUMBER OF LOST PACKETS |
|---|---|

RECEIVED MAXIMUM SEQUENCE NUMBER

ARRIVE INTERVAL JITTER

TIME OF LAST SENDER REPORT PACKET

TIME FROM LAST SENDER REPORT PACKET

SYNC SOURCE IDENTIFIER OF LAST SOURCE

| LOSS RATE | TOTAL NUMBER OF LOST PACKETS |
|---|---|

RECEIVED MAXIMUM SEQUENCE NUMBER

ARRIVE INTERVAL JITTER

TIME OF LAST SENDER REPORT PACKET

TIME FROM LAST SENDER REPORT PACKET

INFORMATION UNIQUE TO APPLICATION

END OF PROCESSING FOR ONE FRAME

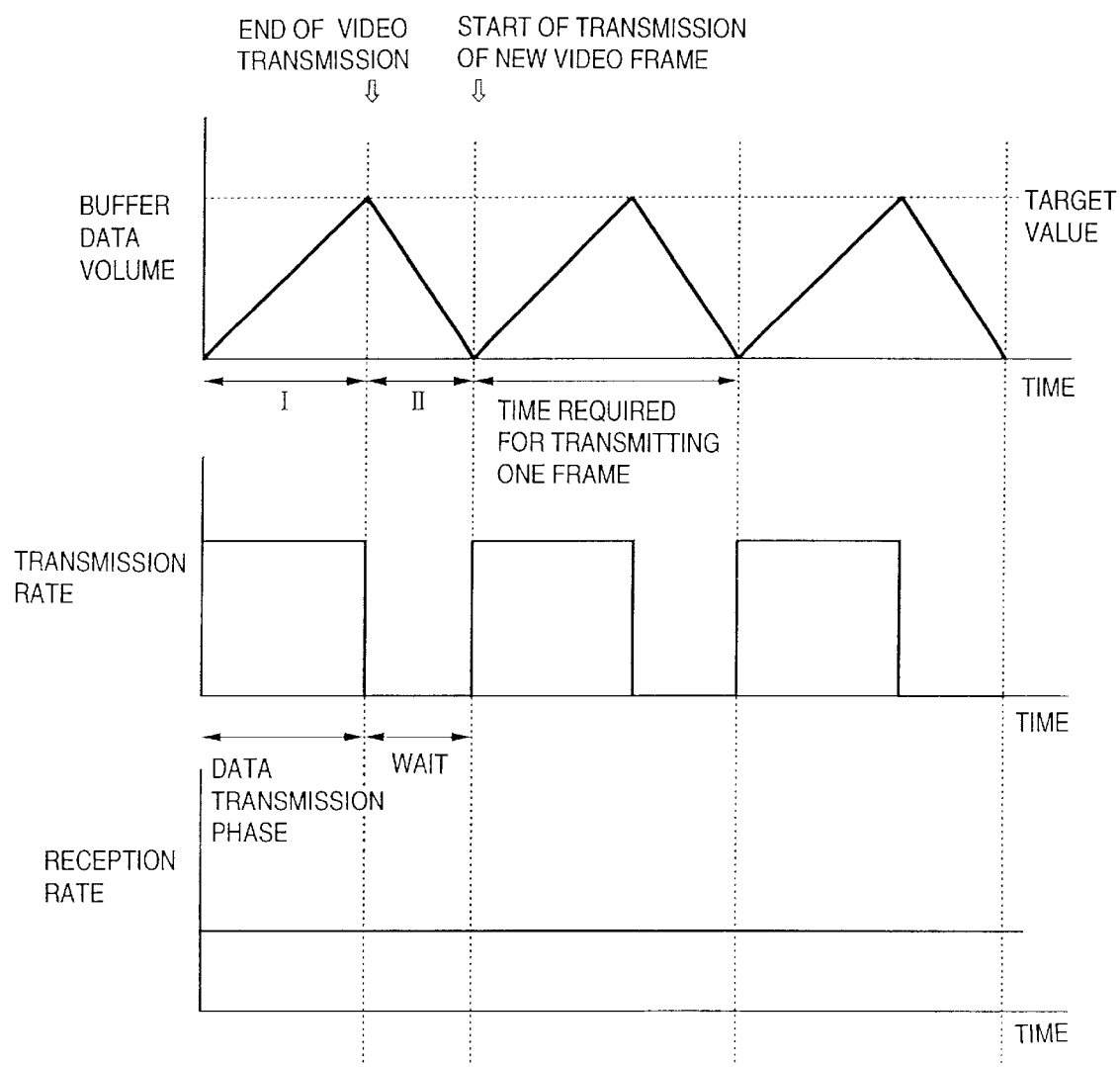

DATA COMMUNICATION APPARATUS AND METHOD

BACKGROUND OF THE INVENTION

The present invention relates to an apparatus and system for transmitting and/or receiving steadily generated data such as video data, audio data, and the like via a network.

Upon transmitting/receiving data via a network, the output rate of data onto the network is important. That is, if data is output beyond the transmission capacity that can be used in the network, data losses occur; if the output rate is too low, the usable band of the network cannot be sufficiently used, and required quality cannot be obtained. In such case, data losses on the network are monitored to adjust the output rate, and if losses occur, the output rate is lowered.

A large number of notes are distributed between the transmitting and receiving sides on the network, and respectively have buffers that can save data. Hence, when data has been excessively output and losses have taken place, some of buffers on the network are likely to have overflown. Even when the output rate is lowered after the losses have actually occurred, since buffers somewhere on the network are already full of data, data output from the transmitting side reaches the receiving side with a transmission delay corresponding to the time required for processing the data saved in such buffers by the network, thus posing a serious problem in data communications that requires real-time processing.

That is, data is required to be output at an output rate that satisfactorily use the available network band while suppressing a transmission delay below a given value.

As described above, when two end terminals exchange data via the network, some data which were output onto the network have not arrived the receiving side since they are still present on the buffers in intermediate nodes on the network or the transmission lines. Since data which stay in the buffers in the intermediate nodes may also cause a transmission delay, the output rate must be controlled to prevent such data volume from becoming too large, so as to suppress any transmission delay below the given value. However, the transmitting and receiving terminals cannot detect the volume of data that stay in the buffers in the intermediate nodes on the network, especially, on the internet.

SUMMARY OF THE INVENTION

It is an object of the present invention to provide a data communication apparatus, method, system, and storage medium, which can reduce deterioration in the real time communication caused by the volume of unarrived data on the network.

It is another object of the present invention to provide a data communication apparatus, method, system, and storage medium, which perform data communications at an optimal transfer rate on the basis of the volume of unarrived data on the network present between two end terminals.

It is another object of the present invention to provide a data communication apparatus, receiving apparatus, control method, storage medium, and data communication system, which can realize optimal data transfer by dynamically controlling to change the transfer rate in correspondence with the conditions on the network in data communications via the network.

The present invention has been made in consideration of the above situation, and has as its still another object to provide a video communication system, video transmitting apparatus, video receiving apparatus, their control method, and storage medium, which can efficiently transfer video data by appropriately adjusting the transfer rate of video data by fully utilizing the transmission band of the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows an example of the format of transmission data;

FIG. 5 shows an example of the format of reception data;

FIG. 10 shows an example of the format of a receiver report in the fourth embodiment;

FIG. 11 shows the format of an RTCP receiver report packet as an example of the fourth embodiment;

FIG. 17 is a graph showing ideal changes in network buffer data volume and transmission/reception rate in the fifth embodiment.

DETAILED DESCRIPTION OF THE EMBODIMENTS

The preferred embodiments of the present invention will be described in detail hereinafter with reference to the accompanying drawings.

First Embodiment

Figure 1:
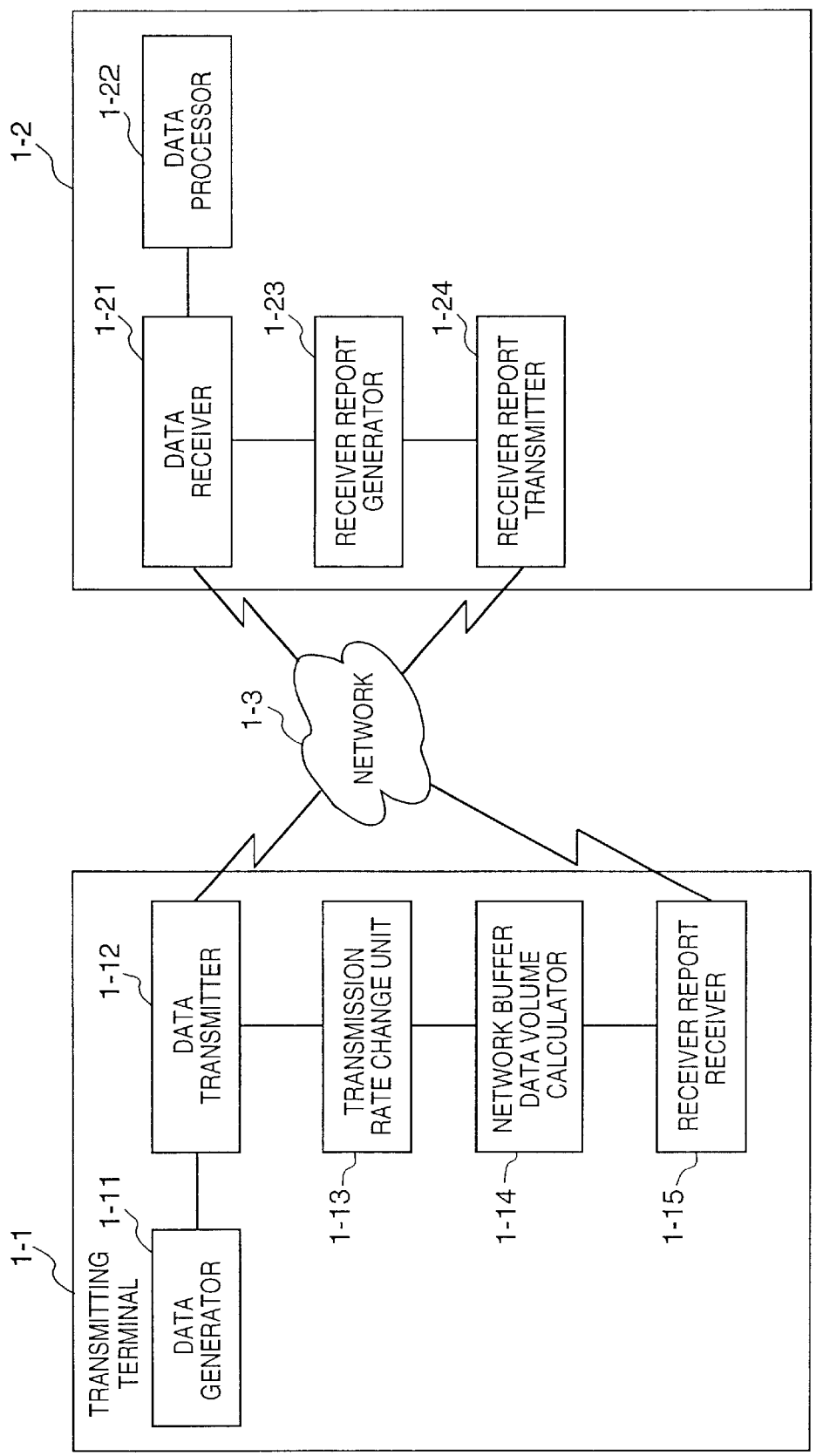
FIG. 1 is a block diagram of an apparatus used in the first to fourth embodiments of the present invention.

FIG. 1 shows the connection relationship and structure of the respective devices when data transmitted by a transmitting terminal 1—1 is received by a receiving terminal 1-2 via a network 1-3. Note that the network 1-3 includes anything from LANs used in corporations to a collection of many and unspecified networks coupled to each other (e.g., the internet), and is not particularly limited. The arrangements and operations of the terminals shown in FIG. 1 will be explained below.

The transmitting terminal 1—1 generates data by a data generator 1-11. More specifically, the data to be generated includes, e.g., video data or the like captured by a video camera. The data generator 1-11 captures and compresses video data. However, the data contents are not limited to video data.

The data generated by the data generator 1-11 is sent to a data transmitter 1-12. The data transmitter 1-12 segments the received data into a proper size, assigns sequence numbers to these segmented data, and outputs them onto the network 1-3. At this time, the data transmitter 1-12 adjusts the data size to be segmented and the output interval of segmented data in accordance with the rate designated by a transmission rate change unit 1-13, and then transmits data.

After such transmission, the receiving terminal 1-2 sends back a receiver report. A receiver report receiver 1-15 receives the receiver report, and sends the report contents to a network buffer data volume calculator 1-14. The transmission rate change unit 1-13 determines the transmission rate on the basis of the data volume calculated by the network buffer data volume calculator 1-14, and designates the transmission rate to the data transmitter 1-12.

On the other hand, in the receiving terminal 1-2, the data transmitted via the network 1-3 are received by a data receiver 1-21. The received data are sent to and processed by a data processor 1-22. For example, when the received data form video data, processing for displaying an image (decoding, display processing, and the like) is executed by the data processor 1-22.

The data receiver 1-21 measures information pertaining to the sequence number of the received data, data reception time, the received data volume, and the like, and sends that information to a receiver report generator 1-23. The receiver report generator 1-23 calculates the reception rate that must be included in the receiver report, and supplies it to a receiver report transmitter 1-24 together with the sequence number.

The receiver report transmitter 1-24 transmits the receiver report to the receiver report receiver 1-14 of the transmitting terminal 1—1 via the network 1-3.

The operation sequences of the transmitting and receiving terminals, and the method of determining the transmission rate will be explained in detail below with reference to FIGS. 2 and 3.

The operation of the transmitting terminal will be described below with the aid of FIG. 2. Note that the processing in steps S201 and S202, and the processing in steps S203 to S205 are different tasks, as can be seen from the following description.

Data to be transmitted is generated (step S201). For example, when video data is to be transmitted, an image is captured by a video camera, and the captured video data is compressed and coded. The data is broken up into data (packets) each having an appropriate size, and the packets are output onto the network at appropriate intervals (step S202). The transfer rate at that time is determined based on the packet size and output interval. The method of determining the transmission rate will be explained later. Upon completion of transmission of data, data generation (step S201), and transmission (step S202) repeat themselves. FIG. 4 shows an example of the format of transmission data. Note that the sequence number and transmission time change every time a packet is transmitted.

On the other hand, the transmitting terminal waits for a receiver report sent from the receiving terminal simultaneously with data transmission (step S205). FIG. 5 shows an example of the format of the receiver report. The receiver report includes the reception sequence number and reception rate. Note that the reception sequence number is the one included in the last packet received by the receiving terminal upon generating a receiver report, and the reception time is the time at which the receiving terminal received that packet. Upon reception of the receiver report, the transmitting terminal calculates the volume of data which has been output from the transmitting terminal onto the network but has not reached the receiving terminal (step S204). This data volume will be referred to as a network buffer data volume hereinafter. The method of calculating the network buffer data volume is as follows.

A network buffer data volume BUFcur is obtained by multiplying a packet size Psize by the difference between a sequence number SEQsend of the last packet output from the transmitting terminal and a reception sequence number SEQrecv included in the receiver report sent back from the receiving terminal:

$$BUFcur = Psize \times (SEQsend - SEQrecv)$$

Note that the time (timer) of the receiving terminal does not always perfectly match that of the transmitting terminal. For this reason, the transmitting terminal may calculate:

$$(Ts2-Ts1)-(Tr2-Tr1)$$

where Ts1 is the transfer time of data of a given sequence number, Tr1 is the reception time of that data at the receiving side, Tr2 is the transfer time of that receiver report, and Ts2 is the reception time of the receiver report including the sequence number. This difference may be divided by "2" to obtain the time required for transfer. The reason why the difference is divided by "2" is that the difference corresponds to a round trip. In this case, the receiving side adds the reception time and the output time of the receiver report.

If the processing time on the receiving time is negligibly short, since the round-trip time alone need be considered, the receiving side need not insert the reception time and output time in the receiver report.

Then, a transmission rate Rnew is determined so that the calculated network buffer data volume BUFcur approaches a target value BUFdes of the network buffer data volume (step S203). The calculation formula is as follows:

$$Rnew = Rcur + C \times (BUFdes - BUFcur)$$

where Rcur is the current transmission rate, and Rnew is the new transmission rate to be determined. C is an appropriate constant. The transmission rate R determined by this processing is supplied to the data transmitter to designate the transmission rate in the data transmission step (S202).

With this operation, in the transmitting terminal 1—1, the network buffer data volume calculator 1-14 calculates the buffer capacity of the network present between the two terminals in accordance with the receiver report from the receiving terminal 1-2, and the transmission rate change unit 1-13 sets the data transfer rate in the data transmitter 1-12 in accordance with the calculation result.

The operation of the receiving terminal will be described below with reference to the flow chart in FIG. 3.

Data transmitted via the network are received by the data receiver (step S301). The received data are processed by the data processor (step S304). For example, when video data is received, an image is displayed, and so forth. The reception time, data volume, and reception sequence number obtained by extracting the sequence number from the packet data are sent to the receiver report generator. Based on such information, a receiver report is generated periodically (e.g., every 3 sec) (step S302). The receiver report is generated to include information of the reception sequence number and reception rate. The generated receiver report is transmitted to the receiver report receiver of the transmitting terminal via the network (step S303). FIG. 5 shows an example of the format of the receiver report.

By repeating the above-mentioned steps, the receiving terminal periodically transmits receiver reports to the transmitting terminal while transmitting/receiving data between the transmitting and receiving terminals. On the other hand, the transmitting terminal determines the transmission rate based on the receiver report to make the network buffer a constant volume of data.

Figure 6:
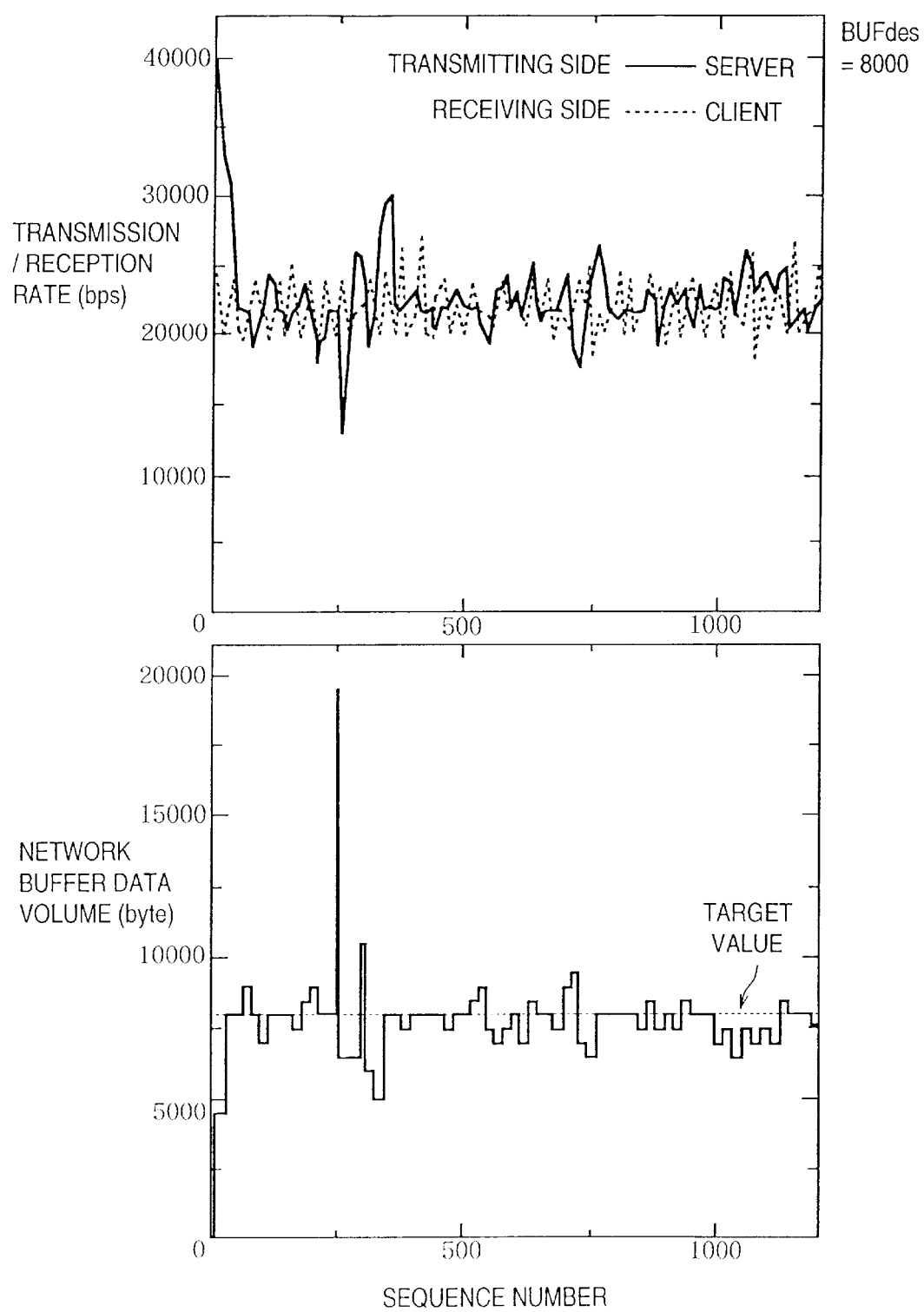
FIG. 6 is a graph showing the variations of transmission/reception rate and network buffer data volume in the embodiment.

FIG. 6 shows an example of variations of the transmission and reception rates and network buffer data volume actually measured in data communications of this embodiment. The transmission and reception rates stabilize at an identical value around the available band of the network, and the network data buffer volume changes in the neighborhood of the target value.

Figure 7:
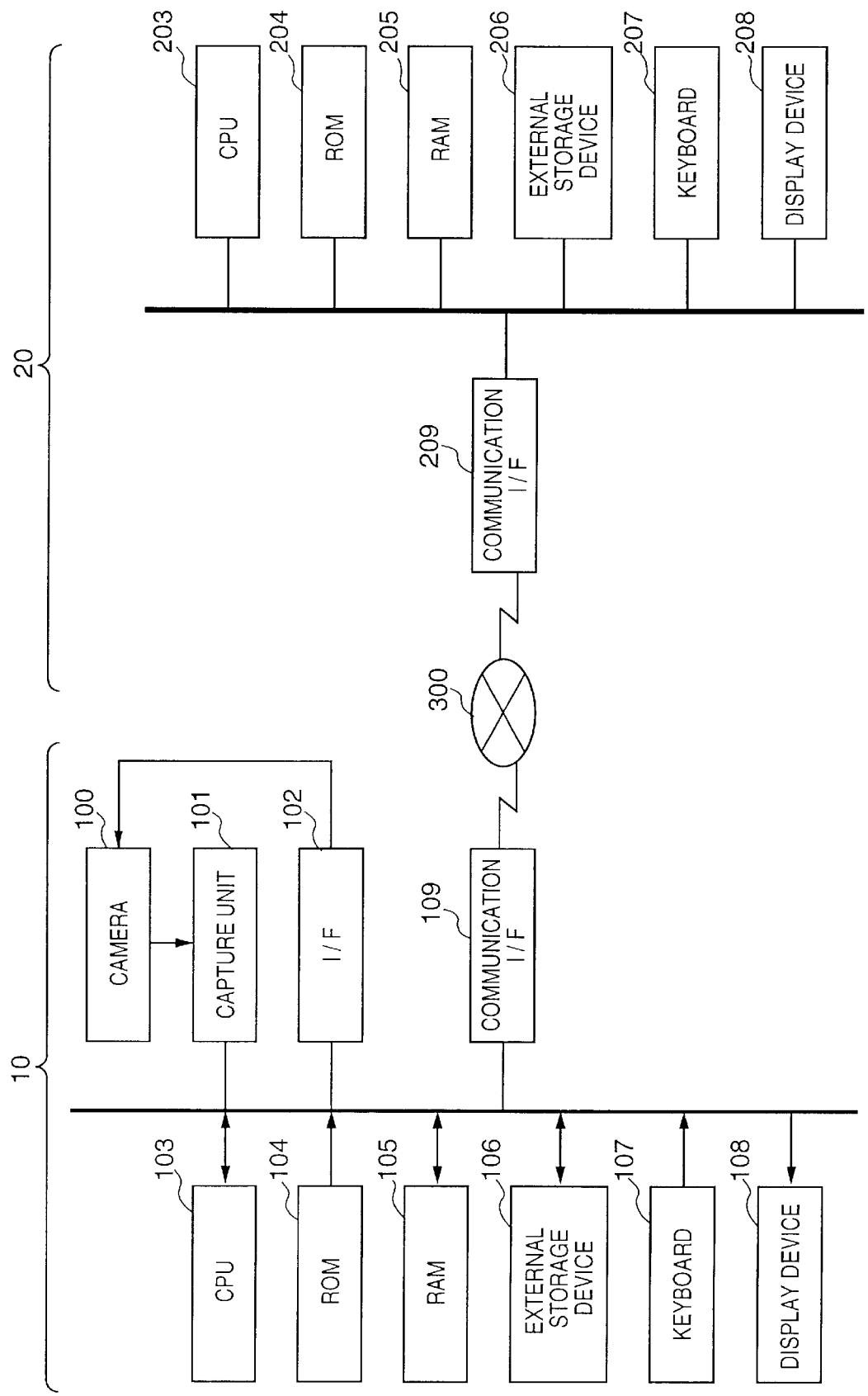
FIG. 7 is a block diagram showing an example of the system arrangement in the embodiment.

FIG. 7 shows an example of an application.

In FIG. 7, reference numeral 10 denotes a camera server, which transfers video data captured by a camera 100 to a client 20 via a network 300. In case of the above embodiment, the camera server 10 corresponds to the transmitting terminal 1—1, and the client 20 corresponds to the receiving terminal 1-2.

The hardware difference between the camera server 10 and client 20 is the presence/absence of the camera and capture unit, and they can be implemented by, e.g., personal computers. That is, components 103 to 109 and 203 to 209 form substantially the same arrangements, which can be implemented by versatile computers (e.g., personal computers).

On the other hand, the software difference is as follows. That is, software (stored in an external storage device 106 and is loaded onto a RAM 105 upon execution) for transferring the captured video data to the client is running on the camera server 10, and software (stored in an external storage device 206 and is loaded onto a RAM 205 upon execution) for receiving video data and displaying the received video data is running on the client 20.

Note that FIG. 7 separately illustrates the camera server and client for the sake of convenience. However, if a video capture function is added to both the terminals, they can serve as both the camera server and client.

When the operation of the aforementioned embodiment is applied to this system, the video data transfer rate in the camera server 10 is to be adjusted. Various factors determine the video data transfer rate. In the following description, the transfer rate is adjusted by appropriately changing the capture time interval.

The operation of the camera server will be explained below.

Figure 8:
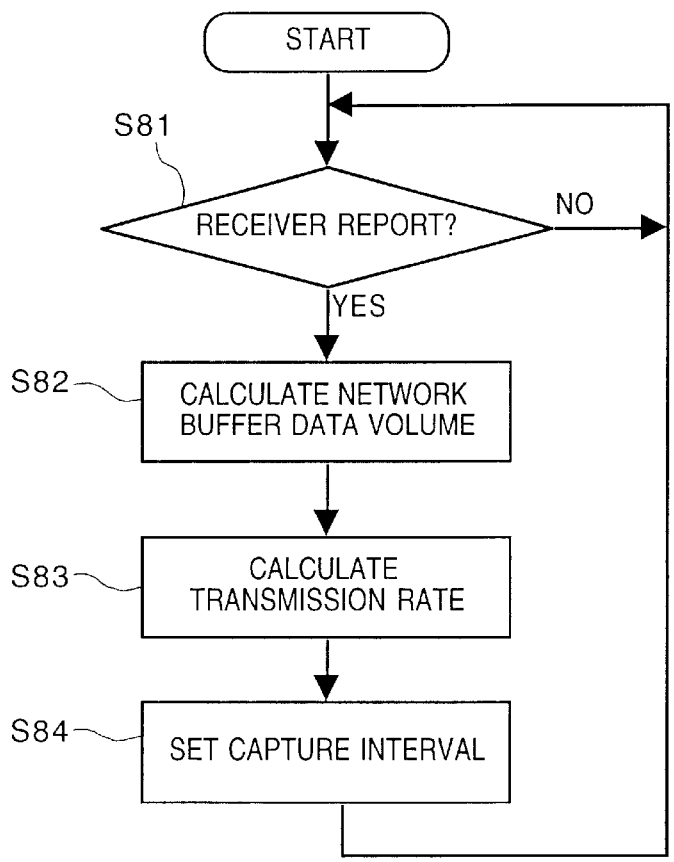
FIG. 8 is a flow chart showing the processing contents of a camera server in FIG. 7.
Figure 9:
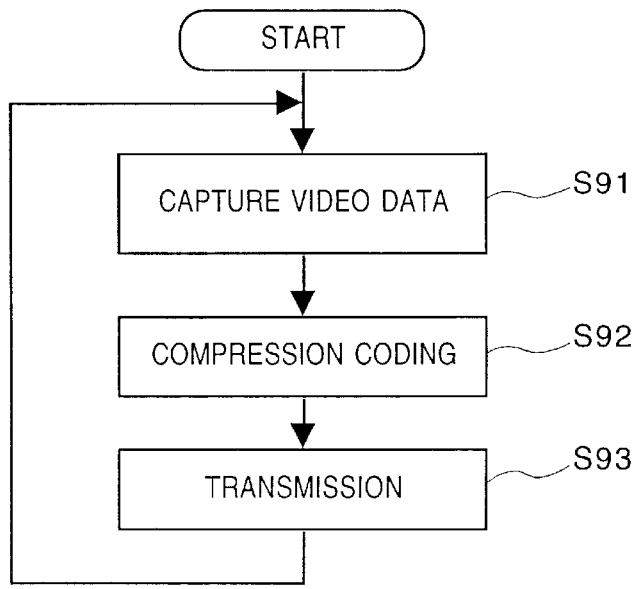
FIG. 9 is a flow chart showing the processing contents of the camera server in FIG. 7.

FIGS. 8 and 9 are flow charts showing the operation processing in the camera server. That is, FIG. 8 shows the processing for determining the capture time interval on the basis of the receiver report transmitted from the client, and determining the number of video frames to be captured per unit time, thereby consequently varying the data transfer rate per unit time, and FIG. 9 shows the processing for transferring the captured video data.

In step S81, the control waits for receiving a receiver report (see FIG. 5) from the client 20. If the report is received, the flow advances to step S82 to calculate the network buffer data volume. The flow then advances to step S83 to determine the transmission rate (transfer data volume per unit time) to approach a target buffer data volume. The flow advances to step S84 to determine the number of video frames that can be transferred per unit time at the calculated transfer rate, and set it as the capture time interval. Then, the steps S81 to S84 repeat themselves.

On the other hand, the transfer processing (FIG. 9) operates at the time interval determined in step S84 above.

A capture unit 101 fetches video data captured by the camera 100 in step S91, and compresses and encodes the video data in step S92. In step S93, the compressed and encoded video data including the transmission sequence number, transmission time, and packet size is transferred in units of packets, as described above.

As a consequence, data transfer between two terminals via the network can be optimally done in correspondence with the buffer capacity of that network. Even when the network traffic is very smooth and a high transfer rate may be set, the data transfer is controlled to make constant the data volume which stays as buffer data on the network without increasing the transfer rate. Hence, the load on the network can be reduced, and use of the network by other parties is not disturbed.

Figure 3:
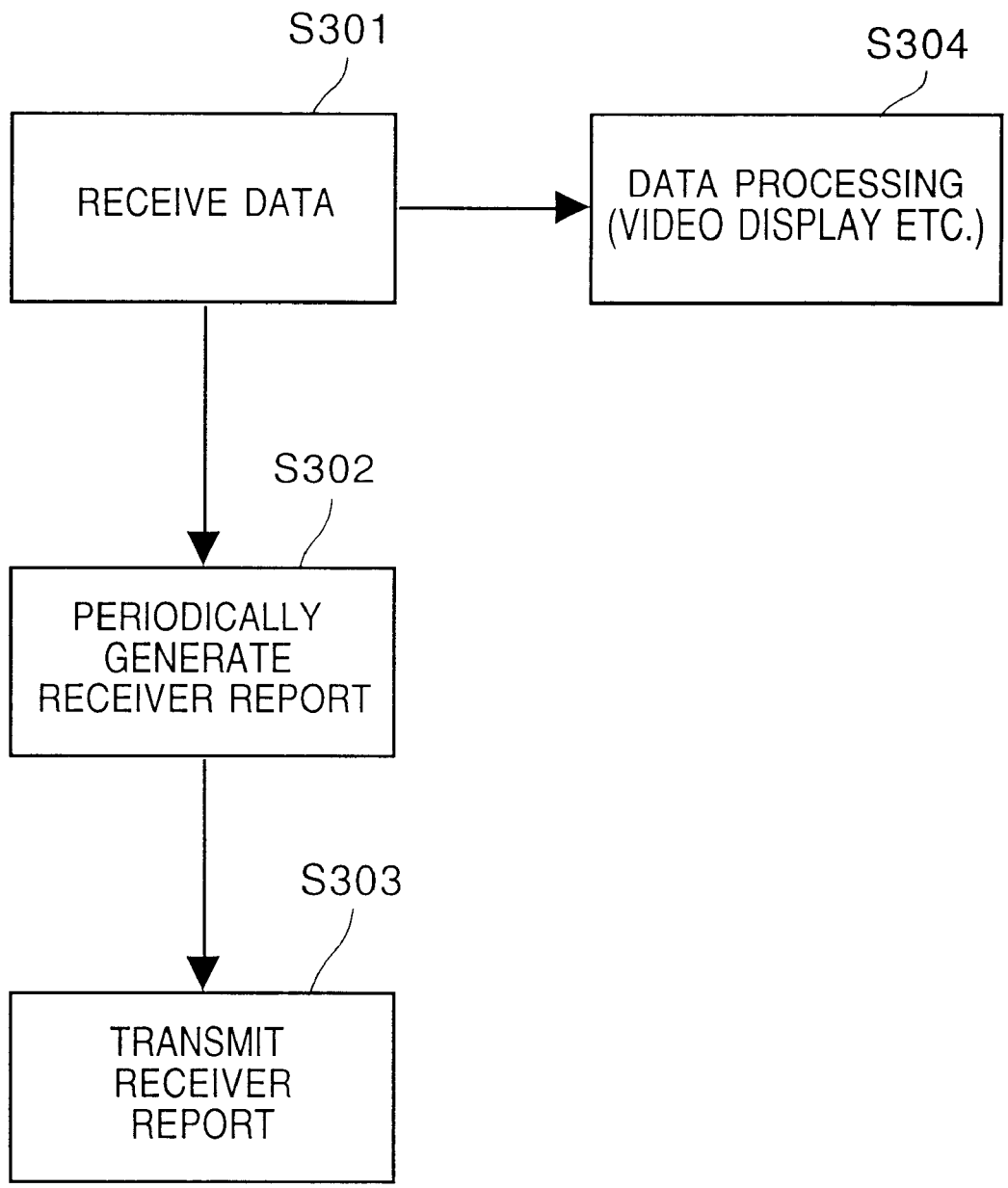
FIG. 3 is a flow chart showing the operation processing contents on the receiving side in the embodiment.

Note that the processing on the client side can be easily understood from the above description, and is substantially the same as that shown in FIG. 3. Hence, a detailed description thereof will be omitted.

As described above, the transfer rate can also be changed by changing the packet size. This is because the ratio of original data volume with respect to control of, e.g., address information included in each packet changes.

The initial transfer rate (Rcur) in this embodiment is preferably appropriately set in correspondence with the type of network and the type of interface connected to that network. For example, if the system is built in the office, since the Ethernet (10 Mbps or 100 Mbps) may be used, a high initial transfer rate can be set.

Second Embodiment

The second embodiment is substantially the same as the first embodiment, except for the sequence (S203 in FIG. 2) for calculating the transmission rate. In the first embodiment, a new transmission rate is determined with reference to the current transmission rate. However, in this embodiment, the transmission rate is determined with reference to a rate reported by the receiver report:

$$Rsend = Rrecv + C \times (BUFdes - BUFcur)$$

where Rsend is the transmission rate, and Rrecv is the reception rate calculated based on the receiver report.

In this fashion, when the transmission rate is determined based on the reception rate, high followability for the reception rate is expected when the transmission rate is corrected upon variation of an available band due to changes in network condition.

Third Embodiment

The operation sequence of the third embodiment is also nearly the same as those in the first and second embodiments, except for the sequence (S203 in FIG. 2) for calculating the transmission rate. In the first and second embodiments, for the constant C used in control for determining the transmission rate, a value that assures stable operation must be empirically found. However, in the third embodiment, the transmission rate is determined without using such constant.

If the interval between adjacent receiver reports is known, the transmission rate is determined so that the network buffer data volume matches a target value just upon arrival of the next receiver report. That is, the transmission rate Rsend is determined by:

$$Rsend = Rrecv + \{(BUFdes - BUFcur)/Interval\}$$

With this processing, if the data is kept processed on the network at the reported reception rate Rrecv, the network buffer data volume BUFcur matches the target value BUFdes just upon reception of the next receiver report.

To restate, according to the first to third embodiments, the transmission rate is controlled to maintain constant the data volume (network buffer data volume) which has been output from the transmitting terminal but has not arrived the receiving terminal yet. With this control, since the data volume which is making its journey on the network is controlled, a transmission delay can be suppressed to fall within an allowable range. Since data is transmitted/received to always save data in a buffer, the available band of the network can be sufficiently used to transmit/receive the data.

Note that the present invention is effectively applied to a large-scale network such as the internet. or the like.

To recapitulate, according to the first to third embodiments, data communications can be made at an optimal transfer rate on the basis of the unarrived data volume on the network present between two terminals.

Hence, the present invention is effective for real-time processing, e.g., transferring live images captured by a camera.

Fourth Embodiment

The fourth embodiment will be described below. The arrangement of the transmitting and receiving terminals of the fourth embodiment is the same as that in the first embodiment. Also, the transmitting terminal determines the transmission rate on the basis of a receiver report sent from the receiving terminal as in the first embodiment. Hence, the overall operations are the same as those shown in FIGS. 2 and 3, and the format of transmission data is the same as that shown in FIG. 4. However, the format of the receiver report sent from the receiving terminal 1-2 in the fourth embodiment is as shown in FIG. 10.

Assume that the receiver report includes a reception sequence number (directly using the transmission sequence number), reception rate and time, and receiver report transmission time, as shown in FIG. 10.

Figure 2:
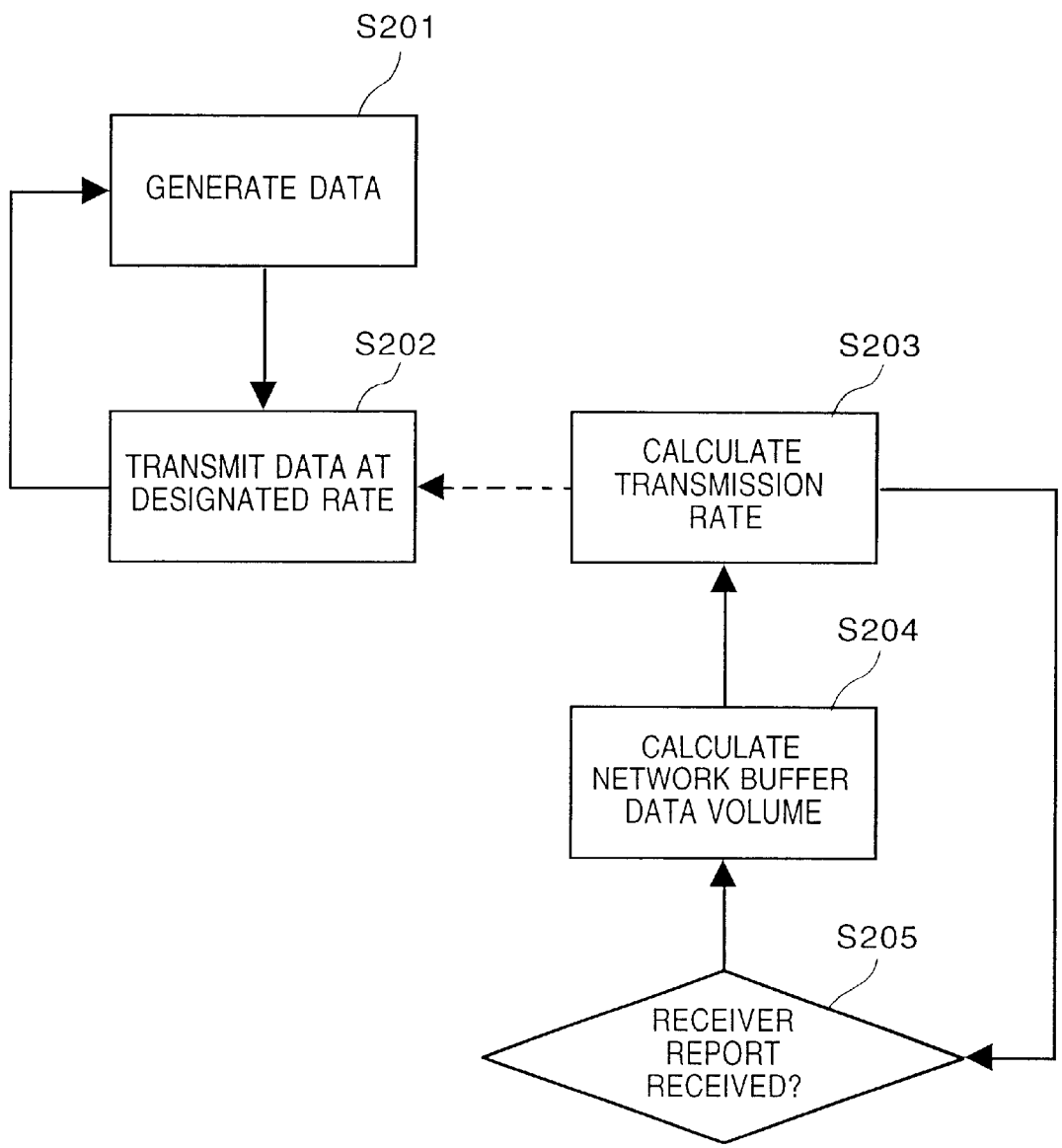
FIG. 2 is a flow chart showing the operation processing contents on the transmitting side in the embodiment.

Upon reception of this receiver report, the transmitting terminal 1—1 measures the data round-trip time between the transmitting and receiving terminals, and calculates the volume (network buffer data volume) of data which has been output from the transmitting terminal onto the network but has not reached the receiving terminal yet on the basis of the round-trip time, in step S204 in FIG. 2. The method of calculating the network buffer data volume in the fourth embodiment will be explained below.

Since the round-trip time includes the time required from when the receiving terminal receives data until it outputs a receiver report, that time must be subtracted from the measured time. That is, a true round-trip time RTTcur of data transmission is given by:

$$RTTcur = (Ts2 - Ts1) - (Tr2 - Tr1)$$

where Ts1 is the transmission time (also the time added to the transmission packet) included in the receiver report, and Ts2 is the reception time of the receiver report by the transmitting terminal. Also, Tr1 is the data reception time included in the receiver report, and Tr2 is the receiver report transmission time included in the receiver report.

For example, if the reception time of the receiver report as shown in FIG. 10 is 10:11:13.526 on Apr. 15, 1997, the round-trip time is:

$$RTTcur = (13.526 - 12.988) - (13.512 - 13.302)$$

$$= 0.328 \text{ sec}$$

(note that the time is calculated while ignoring year, month, date, time, and minute data).

When the data round-trip time is calculated using such method, an accurate round-trip time required for data transmission can be calculated even when the times of the timers of the receiving and transmitting terminals do not match each other. Since the transmitting terminal need only obtain the time required for the internal processing of the receiving terminal, the receiving terminal may add that time in place of the reception and transmission times. Also, if the transmitting terminal stores the sequence numbers and transmission times of previous transmission data, the "data transmission time" in FIG. 10 may be omitted.

The transmitting terminal (the terminal that provides a video distribution service) in the fourth embodiment holds the minimum value of the calculated data round-trip times as a reference round-trip time RTTbase. The reference round-trip time RTTbase uses the round-trip time RTTcur calculated upon reception of the first receiver report after the beginning of data transmission/reception.

That is, at the beginning of transmission,

RTTbase = RTTcur

After that, every time a receiver report is received, RTTcur is calculated. The calculated round-trip time RTTcur is compared with RTTbase, and if RTTcur is smaller than RTTbase, the RTTbase is updated by that RTTcur:

$$RTTbase = RTTcur (IF\ RTTcur < RTTbase)$$

The network buffer data volume is calculated on the basis of the difference between the reference value RTTbase of the data round-trip time and the latest measured round-trip time RTTcur.

In practice, if Rrecv represents the reception rate (bits/sec) included in the receiver report, the current network buffer data volume BUFcur is calculated by:

$$BUFcur = Rrecv * (RTTcur - RTTbase)$$

As can be easily understood from the above description for those who are skilled in the art, RTTcur or the like is the required round-trip time, and the time required until data output from the transmitting terminal reaches the receiving terminal (one-way time) must be originally calculated. However, since the one-way time and round-trip time have a linear relationship therebetween, and the round-trip time itself is not reflected in the transmission rate in this embodiment but the transmission rate is calculated by multiplying the time with the constant C, as will be described later, the one-way time and round-trip time have substantially no conceptual difference therebetween and, hence, the round-trip time is used in this embodiment.

In this embodiment, a transmission rate Rnew is determined so that the calculated network buffer data volume BUFcur approaches the target value BUFdes of the network buffer data volume (step S203). The transmission rate Rnew is calculated by:

$$Rnew = Rcur + C * (BUFdes - BUFcur)$$

where Rcur is the current transmission rate, and Rnew is the new transmission rate to be determined. C is an appropriate constant. The transmission rate Rnew determined by this processing is supplied to the data transmitter to designate the transmission rate in the data transmission step (step S202 in FIG. 2).

In this embodiment, the transmission rate is determined with reference to the transmission rate Rcur but may be determined with reference to the reception rate Rrecv. If the reception interval (Interval) of the receiver reports is known, the transmission rate Rnew may be calculated so that the network buffer data volume matches the target value upon arrival of the next receiver report:

$$Rnew=Rrecv+\{(BUFdes-BUFcur)/Interval\}$$

The target network buffer data volume BUFdes used in this case is preferably designated below the buffer volume mounted in a network equipment such as a router or the like in practice.

The operation processing of the receiving terminal in the fourth embodiment is the same as that shown in FIG. 3, as described above.

Data transmitted via the network are received by the data receiver (step S301). The received data are passed to the data processor (step S304). For example, when video data is received, the received data is passed to video display processing. The data reception time, data volume, and reception sequence number are sent to the receiver report generator. Based on such information, a receiver report is generated periodically (e.g., every 3 sec) (step S302). The receiver report is generated to include information of the reception sequence number, reception rate, data reception time, and receiver report transmission time. The generated receiver report is transmitted to the receiver report receiver of the transmitting terminal via the network (step S303). An example of the format of the receiver report is as shown in FIG. 10.

By repeating the above-mentioned steps, the receiving terminal periodically transmits receiver reports to the transmitting terminal while transmitting/receiving data between the transmitting and receiving terminals. On the other hand, the transmitting terminal calculates the data round-trip time based on the transmission/reception time records in the receiver report and then calculates the network buffer data volume based on an increment from the minimum data round-trip time. Then, the transmitting terminal determines the transmission rate to make the network buffer data volume constant.

In the fourth embodiment, the receiving terminal calculates the reception rate, and sends back a receiver report including that rate to the transmitting terminal. However, since the receiver report contains the sequence number of the latest received data, the transmitting terminal can calculate the reception rate as long as it holds the reception sequence number and receiver report time reported by the previous receiver report, and packet size information. In this way, the reception rate can be calculated by the transmitting terminal without being included in the receiver report.

The fourth embodiment can be applied to the system shown in FIG. 7. That is, the contents described with the aid of FIGS. 7 to 9 can directly apply to the fourth embodiment.

When the fourth embodiment is applied to the camera server 10, the operation is done as follows.

In step S81, the control waits for reception of a receiver report (see FIG. 10) from the client 20. If the report is received, the flow advances to step S82 to calculate the data round-trip time RTTcur, and to calculate the network buffer data volume BUFcur based on RTTcur. The flow then advances to step S83 to determine the transmission rate (transfer data volume per unit time) to approach a target buffer data volume.

The flow advances to step S84 to determine the number of video frames that can be transferred per unit time at the calculated transfer rate, and set it as the capture time interval. Then, the steps S81 to S84 repeat themselves.

On the other hand, the transfer processing (FIG. 9) operates at the time interval determined in step S84 above.

The capture unit 101 fetches video data captured by the camera 100 in step S91, and compresses and encodes the video data in step S92. In step S93, the compressed and encoded video data including the transmission sequence number, transmission time, and packet size is transferred in units of packets, as described above.

As a consequence, data transfer between two terminals via the network can be optimally done in correspondence with the buffer capacity of that network. Even when the network is very smooth and a high transfer rate may be set, the data transfer is controlled to make constant the data volume which stays as buffer data on the network without increasing the transfer rate. Hence, the load on the network can be reduced, and use of the network by other parties is not disturbed.

The method described in this embodiment can be implemented in various kinds of networks, e.g., the internet based on the IP protocol, LAN, and the like. A method of practicing the present invention using an RTP (Real Time Transport Protocol) standardized as RFC1889 in January, '96 will be described below. Note that the RTP is a protocol suitable for real-time applications, and is used in place of the TCP in the transport layer. FIG. 11 shows an example of a receiver report packet determined in such RTP.

The aforementioned RTT (data round-trip time) and Rrecv (reception rate) are obtained from the RTCP receiver report packet shown in FIG. 11 by:

$$RTTcur=(Ts2-Ts1)-(Tr2-Tr1)$$

where Ts2 is the reception time of the RTCP receiver report packet, Ts1 is the "time period (time) of the last sender report packet" in the RTCP receiver report packet, and "Tr2–TR1" is the "time period from the last sender packet" in the RTCP receiver report packet. Note that the contents within parentheses in FIG. 11 indicate the above-mentioned parameters.

On the other hand, the reception rate is not defined in RFC1889. Hence, some methods of calculating Rrecv above are available.

For example, if P represents one packet average size, Rrecv is calculated by:

$$Rrecv=P\times(1-L)\times(Sn-Sn\text{-}1)/(Ts2n-Ts2n\text{-}1)$$

where Ts2n is the reception time of the RTCP receiver report packet at time n, and Tsn-1 is the reception time of the immediately preceding RTCP receiver report packet.

Alternatively, Rrecv may be calculated by:

$$Rrecv=\text{(total size of packets output from time }(n\text{-}1)\text{ to }n)\times(1-L)/(Ts2n-Ts2n\text{-}1)$$

Also, other methods may be used.

As can be seen from the above description, the fourth embodiment can use the RTP.

Note that the processing on the client side can be easily understood from the above description, and is substantially the same as that shown in FIG. 3. Hence, a detailed description thereof will be omitted.

As described above, the transfer rate can also be changed by changing the packet size. This is because the ratio of actual data volume with respect to control data, e.g., address information included in each packet changes.

The initial transfer rate (Rcur) in the fourth embodiment is preferably appropriately set in correspondence with the type of network and the type of interface connected to that network. For example, if the system is built in an office, since the Ethernet (10 Mbps or 100 Mbps) maybe used, a high initial transfer rate can be set.

To restate, according to the fourth embodiment, the transmission rate is controlled to maintain constant the data volume (network buffer data volume) that has been output from the transmitting terminal onto the network but has not reached the receiving terminal yet, in accordance with an increase in data round-trip time. With this control, since the data volume which is en route to the destination on the network can be accurately calculated, and is adjusted, a transmission delay can be suppressed to fall within an allowable range. Since data is transmitted/received to always save data in a buffer, the available band of the network can be sufficiently used to transmit/receive the data. Since the data volume buffered in the network is used as a parameter for controlling the transmission rate without directly using the delay time, a sufficient buffer volume which is to exist on the network can be defined as a target buffer data volume, and data can be prevented from being excessively output onto the network.

Note that the present invention is effectively applied to a large-scale network such as the internet or the like.

In the fourth embodiment, the camera server has been exemplified as the transmitting terminal. However, the present invention is not limited to such specific terminal. For example, the present invention maybe applied to a service for reproducing moving picture files stored in an external storage device and distributing them to clients.

As described above, according to the fourth embodiment, the transfer rate is dynamically changed in correspondence with the network condition in data communications via the network, thus realizing optimal data transfer. Hence, the present invention is particularly effective for real-time processing, e.g., transferring live images captured by a camera.

Fifth Embodiment

The concept of the fifth embodiment will be briefly explained below. In the fifth embodiment, communications between a camera server with a camera, which requires real-time data transfer, and a client for receiving and displaying video data transferred from that camera server will be explained.

Data exchange between two terminals (a camera server as a video data source and a client for receiving and displaying video data) via a network will be examined. Data which has been output onto the network but is present in a buffer in an intermediate node on the network and has not reached the receiving side yet is present. Since data which stays in the buffer in the intermediate node also produces a transmission delay, the transmission rate must be controlled to prevent this data volume from becoming too large, so as to minimize any transmission delay of video data. However, the volume of data which stays in the buffer in the intermediate cannot often be detected by the transmitting and receiving terminals (especially in a network such as the internet built by connecting many and unspecified networks). For this reason, the reception condition on the receiving side is reported to the transmitting side, which predicts the volume of data which has been transmitted from the transmitting side but has not reached the receiving side. In order to minimize a video frame delay, the data volume which stays in the buffer on the network can be zero at the beginning of transmission of the first packet of a new video frame. When middle packets of a video frame are being output, data is preferably sent while being saved in the buffer within the range that can prevent the buffer from overflowing, thus improving the use efficiency of an available network band.

The fifth embodiment is characterized by controlling the transmission rate so that a target data volume is saved in the network buffer upon completion of transmission of one video frame. The video capture timing is adjusted to start transmission of the latest video data at a timing when the buffer that had saved the data becomes empty, thus starting transmission of the first packet of the captured video data.

The fifth embodiment according to the present invention will be described in detail below with reference to the accompanying drawings.

Figure 12:
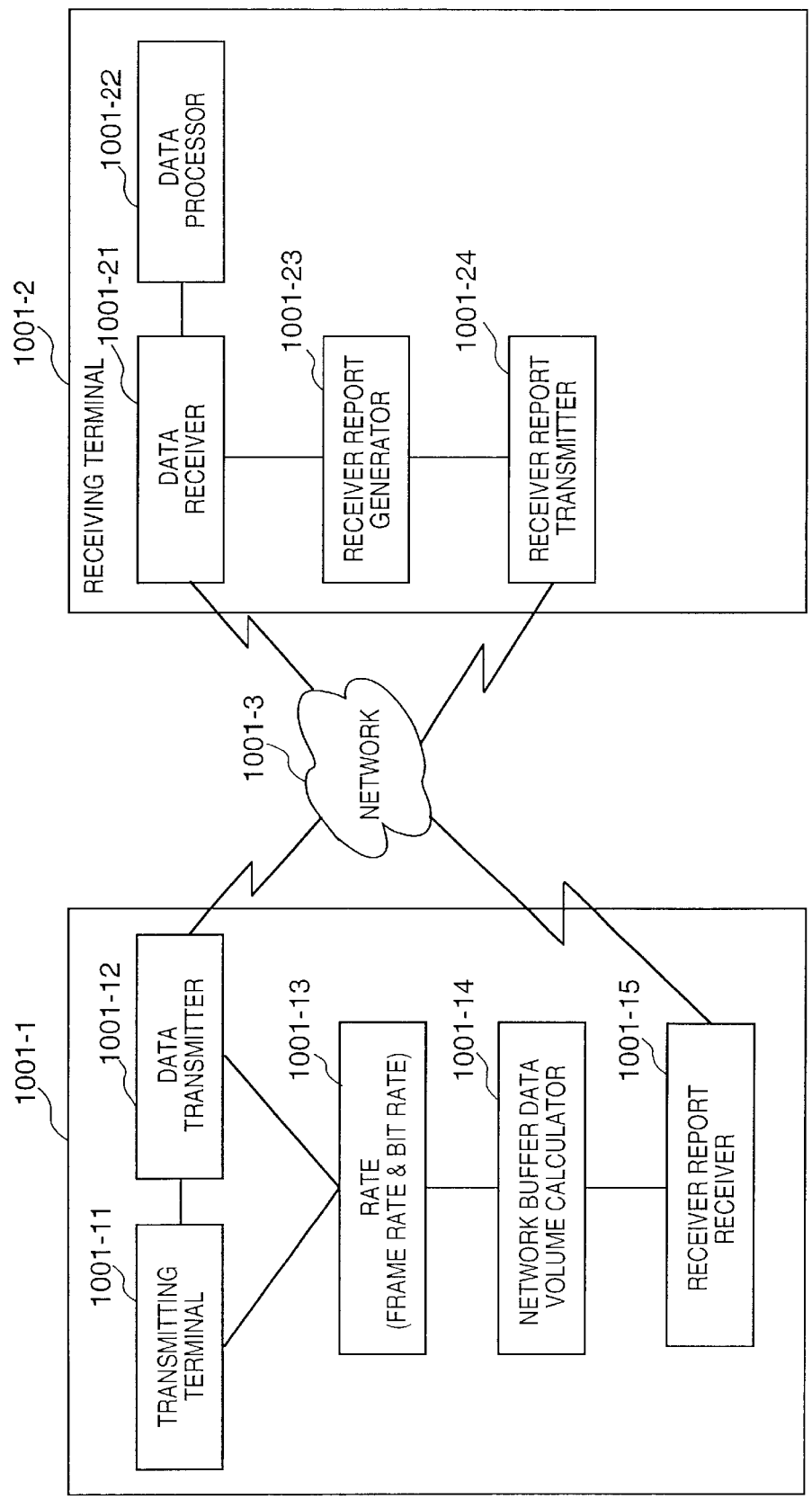
FIG. 12 is a block diagram showing the system in the fifth embodiment.

FIG. 12 shows the arrangement used when data transmitted by a transmitting terminal 1001-1 is received by a receiving terminal 1001-2 via a network 1001-3. Note that the network 1001-3 includes anything from LANs used in corporations to a collection of many and unspecified networks coupled together (e.g., the internet), and is not particularly limited. The terminals shown in FIG. 12 will be described below.

In the transmitting terminal (camera server in this embodiment) 1001-1, a video data generator 1001-11 generates data. Especially, since this embodiment exemplifies a camera server as the transmitting terminal, the data generator 1001-11 includes an image sensing unit (also, a capture unit if necessary), and a unit for compressing and encoding sensed video data. The data generator 1001-11 determines the capture timing of video data of the next frame to be just in time with the frame transmission timing designated by a rate adjuster 1001-13.

The data (compressed image data obtained by image sensing) generated by the data generator 1001-11 is sent to a data transmitter 1001-12. The data transmitter 1001-12 segments the received data into packet data each having an appropriate size, which are output onto the network 1001-3 together with sequence numbers. At this time, the data transmitter adjusts the transmission bit rate to that designated by the rate adjuster 1001-13 by adjusting the packet data size and the output interval of the packet data.

On the other hand, a receiver report receiver 1001-15 receives a receiver report transmitted from the receiving terminal 1001-2, and sends the contents of the report to a network buffer data volume calculator 1001-14. The rate adjuster 1001-13 determines the frame transmission start timing and transmission bit rate on the basis of the data volume and reception rate calculated by the network buffer data volume calculator 1001-14, and designates the frame transmission start timing to the video data generator 1001-11 and the bit rate to the data transmitter 1001-12. The method of determining the video frame transmission start timing and transmission bit rate is a characteristic feature of this embodiment, and will be described later.

In the receiving terminal (a client for sequentially displaying received video data) 1001-2, a data receiver 1001-21 receives data sent via the network 1001-3. The received data is supplied to a data processor 1001-22 and is subjected to processing for displaying the received video data. More specifically, the received packets are reassembled to compressed video frame data, and the compressed data is decompressed (decoded).

On the other hand, information such as the sequence number (information added by the transmitting terminal 1001-1) of the data received by the data receiver 1001-21, data reception time, received data volume, and the like, is sent to a receiver report generator 1001-23. The receiver report generator 1001-23 calculates the reception rate required for the receiver report on the basis of that information, and supplies the reception sequence number and reception rate to a receiver report transmitter 1001-24. Note that the receiver report transmitter 1001-24 does not transmit a report every time one packet is received, but transmits a receiver report including the sequence number included in the latest received packet to the receiver report receiver 1001-14 of the transmitting terminal 1001-1 via the network 1001-3 every time the last packet in a video frame is received.

Hence, the transmitting terminal 1001-1 can detect the number of packets which stay on the network, on the basis of the difference between the sequence number of the latest packet to be transmitted, and the sequence number described in the receiver report received from the receiving terminal. Note that the volume of such unarrived data on the network will be referred to as a network buffer data volume hereinafter. Strictly speaking, the receiver report output from the receiving terminal requires a given time until it reaches the transmitting terminal, and such time must be taken into consideration. However, in the description of this embodiment, the arrival time of the receiver report is ignored since it was confirmed that no serious problem is posed if this is done.

The operation sequence of the transmitting and receiving terminals and the method of determining the transmission rate will be explained in detail below with reference to the flow charts in FIGS. 13 to 16. The processing in the transmitting terminal is classified into those of the video data generator 1001-11, data transmitter 1001-12, and rate adjuster 1001-13, which operate at the same time. Hence, the operations of the respective units will be explained.

Figure 13:
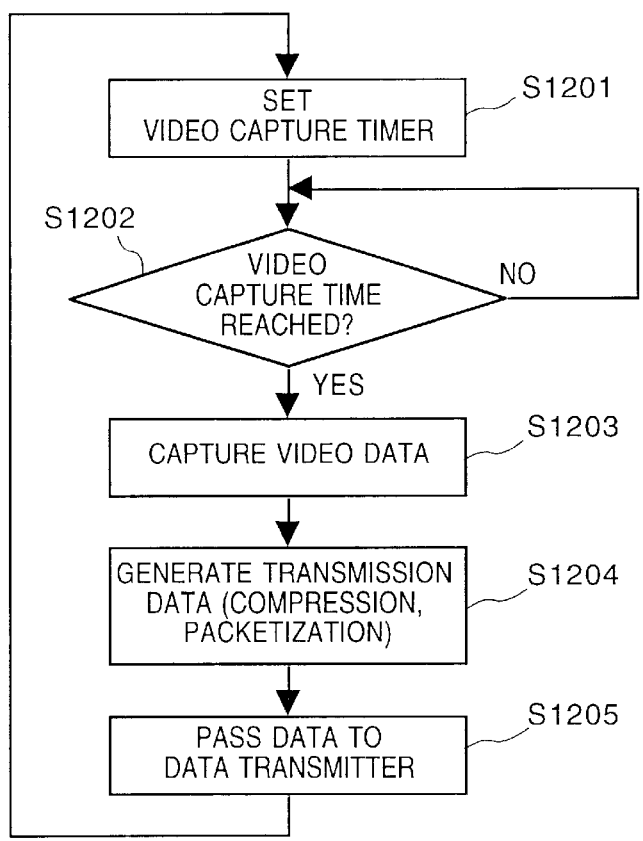
FIG. 13 is a flow chart showing the operation processing sequence of a video data generator on the transmitting side in the fifth embodiment.

The operation processing sequence of the video data generator 1001-11 will be described first with reference to the flow chart in FIG. 13.

The video data generator 1001-11 sets a given time in a timer for video capture (step S1201). This time is determined in correspondence with the video frame transmission interval calculated by the rate adjuster 1001-13. If the time set in the timer has been reached (step S1202), video data is captured (step S1203). The captured video data is compressed and packetized, and sequence numbers are given to the packets to obtain data that can be transmitted (step S1204). These data are passed to the data transmitter 1001-12 (step S1205). After that, the video data generator 1001-11 repeats the processing in steps S1201 to S1205.

Figure 14:
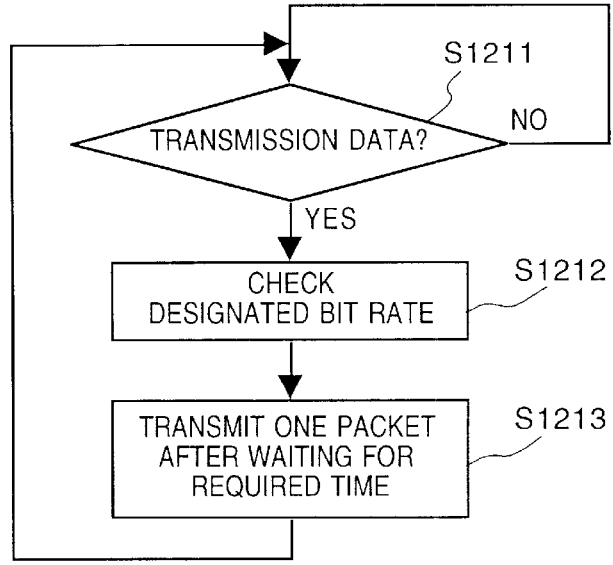
FIG. 14 is a flow chart showing the operation processing sequence of a data transmitter on the transmitting side in the fifth embodiment.

The processing of the data transmitter 1001-12 will be described below with reference to FIG. 14.

The data transmitter 1001-12 checks if there is transmission data passed from the video data generator 1001-11 (step S1211). If YES in step S1211, the data transmitter 1001-12 checks the transmission rate designated by the rate adjuster 1001-13 (step S1212). The data transmitter 1001-12 calculates the packet output interval on the basis of the designated bit rate, and calculates the wait time based on the time elapsed after the previous packet was transmitted. After the data transmitter 1001-12 waits for the calculated time, it transmits one packet data. Then, the data transmitter 1001-12 repeats the processing in steps S1211 to S1213. FIG. 4 shows an example of the format of the transmission data. As shown in FIG. 4, each transmission data consists of the sequence number (information for specifying that data) of that data, transmission time (the time of the transmitting terminal), packet size, and compressed and encoded image data.

The processing of the rate adjuster 1001-13 will be explained below with reference to FIG. 15.

The rate adjuster waits for a receiver report (step S1221). Every time the rate adjuster receives the receiver report, it calculates the transmission start timing of a video frame (captured video data for one frame) and transmission bit rate. Note that an example of the format of the receiver report in the fifth embodiment is the same as that shown in FIG. 5. Hence, the receiver report includes the reception sequence number and reception rate (the number of bits received per unit time, which corresponds to Rrecv to be described later). This embodiment does not use the reception time information. For example, when the times measured by the timers of the transmitting and receiving terminals match each other, the network data buffer volume can be detected more accurately. Upon reception of the receiver report (step S1221), the rate adjuster calculates the volume of data which has been output from the transmitting terminal onto the network but has not reached the receiving terminal yet, on the basis of that report (step S1222). If an interrupt is generated upon reception of the receiver report or the above-mentioned calculations are made in an independent task, the rate adjuster need not always wait for the reception of the report.

The method of calculating the network buffer data volume is as follows.

A network buffer data volume BUFcur is obtained by multiplying a packet size Psize by the difference between a sequence number SEQsend of the last (latest) packet output from the transmitting terminal and a reception sequence number SEQrecv included in the receiver report sent back from the receiving terminal:

$$BUFcur = Psize \times (SEQsend - SEQrecv)$$

Figure 15:
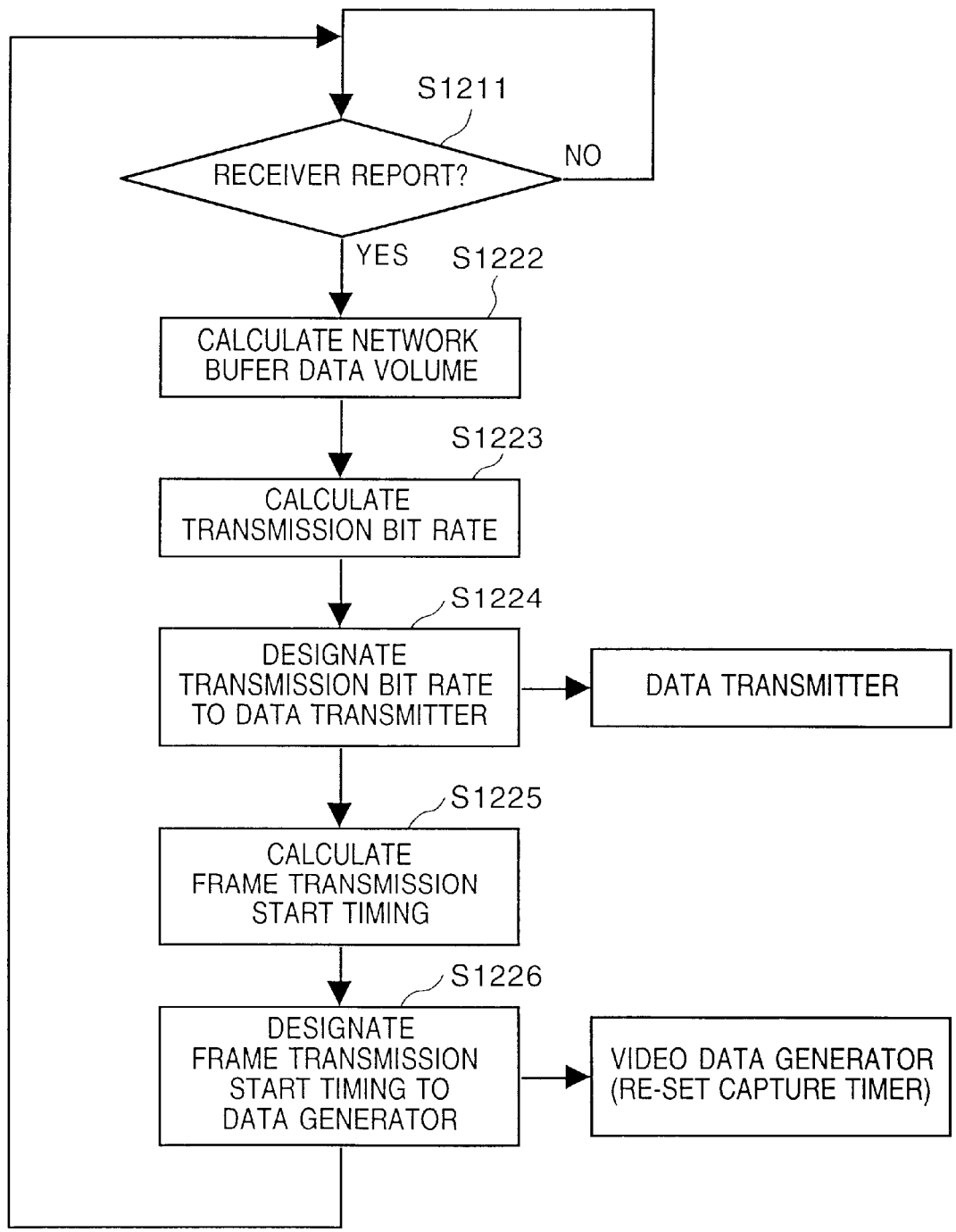
FIG. 15 is a flow chart showing the operation processing sequence of a rate adjuster on the transmitting side in the fifth embodiment.

In order to make the calculated network buffer data volume vary appropriately (to approach a target buffer volume BUFdes), the transmission bit rate and video frame transmission start timing are determined in steps S1223 and S1225 in FIG. 15.

The calculation methods of these transmission bit rate and video frame transmission start timing will be explained below. In practice, the transmission bit rate and video frame transmission start timing are determined to shift the network buffer data volume so that the buffer data volume matches the target value upon completion of transmission of data for one frame, and data in the buffer becomes zero at the beginning transmission of data in a video frame, as shown in FIG. 17.

In this case, at the time of reception of the receiver report, the subsequent bit rate for the video frame which is being currently transmitted, and the transmission start timing of the next frame must be corrected, and the transmission bit rate and frame transmission interval must be determined for the next frame and subsequent frames. A method of calculating the transmission bit rate and frame transmission interval for the next frame and subsequent frames will be explained below. A video frame transmission interval FT is calculated based on the reception rate Rrecv in the receiver report by:

$$FT = FrameSize/Rrecv$$

where FrameSize is the size of the latest image data (encoded data) obtained by capturing, and is not constant.

When FT is calculated, it is supplied to the video data generator 1001-11 (step S1225) and is used for setting the video capture timer (step S1201).

The transmission bit rate is then calculated. A time period ST required for transmission (a period I in FIG. 17) is given by:

$$ST=(FrameSize-BUFdes)/Rrecv$$

Hence, a transmission bit rate Rsend during this time period can be calculated by:

$$Rsend=(Rrecv \times FrameSize)/(FrameSize-BUFdes)$$

A method for correcting the transmission rate for the frame which is being transmitted and the transmission start timing of the next video frame by calculations at the time of reception of the receiver report will be explained below. The calculation method differs depending on whether the transmitting terminal receives the receiver report during data transmission (the period I in FIG. 17) or receives the report while it waits for start of transmission of the next frame without transmitting any data (a period II).

Figure 18A:
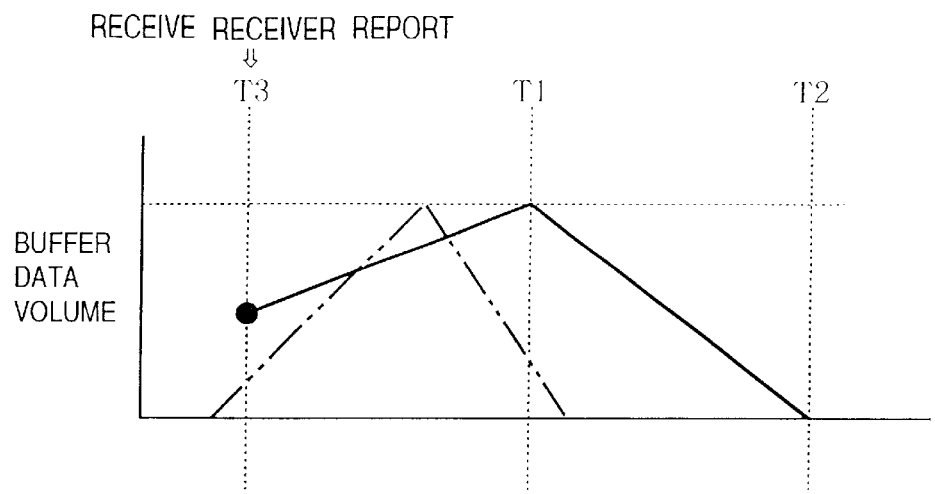
FIGS. 18A to 18C are charts showing the method of determining the transmission rate and the transmission start timing of the next frame with respect to the video frame which is being currently transmitted.

A case will be explained below wherein the receiver report is received during data transmission (period I). Assume that the receiver report is received at time T3, as shown in FIG. 18A, and the calculated network buffer data volume assumes a value BUFcur indicated by the full circle. At this time, the transmission rate Rsend and the transmission start timing of the next frame have already been determined assuming that the buffer data volume shifts, as indicated by the two-dashed chain line in FIG. 18A. The transmission rate and the transmission start timing of the next frame are modified to shift the buffer data volume, as indicated by the solid line. Let FrameRst be the data volume which remains untransmitted in the video frame which is being transmitted. Then, a transmission rate R2 send for the remaining video frame data is calculated by:

$$R2send=Rrecv \times FrameRst/\{FrameRst-(BUFdes-BUFcur)\}$$

The transmission start timing of the next frame can be set at a time FT2 given by equation below after the arrival timing of the receiver report:

$$FT2=(FrameRst+BUFcur)/Rrecv$$

When FrameRst <BUFdes−BUFcur, the transmission rate R2 send undesirably assumes a negative value by the above-mentioned calculation. In such case, the transmission rate R2 send is determined to vary the network buffer data volume, as indicated by the solid line in FIG. 18B. The transmission rate R2 send at that time uses a predetermined maximum transmission rate Rmax. At this time, the transmission start timing of the next video frame is set at a time FT2 given by equation below after arrival time T2 of the receiver report:

$$FT2=\{BUFcur+(Rmax-Rrecv) \times FrameRst/Rmax\}/Rrecv$$

Figure 18B:
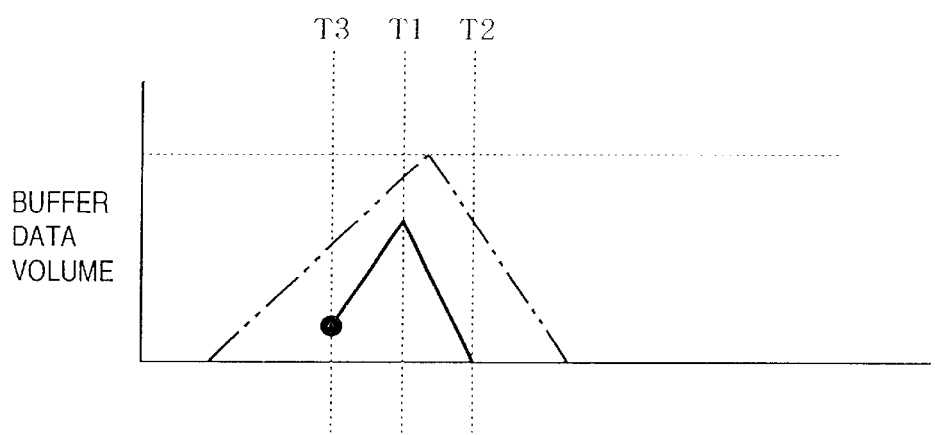
Figure 18C:
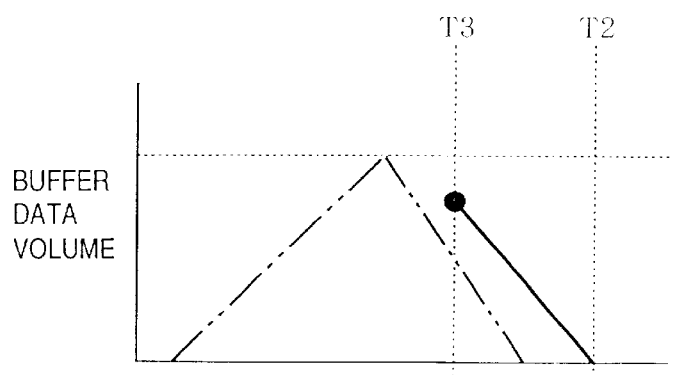

When the receiver report is received while waiting for the start of transmission of the next frame without transmitting any data (period II), the transmission start timing of the next frame is determined, as indicated by the solid line in FIG. 18C. More specifically, FT2 is calculated by:

$$FT2=BUFcur/Rrecv$$

In the above description, the reception rate reported by the receiver report is directly used. Also, the average of several previous data may be calculated, or the reception rate may be autoregressively calculated.

Note that T1 in FIGS. 18A to 18C indicates the data transfer completion timing of one frame, and T2 indicates the transfer start timing of the next frame. As shown in FIGS. 18A to 18C, the transmission rate and timing are determined to obtain the maximum allowable buffer data volume of that network at the transfer completion timing (T1) of video data for one frame, and to minimize the buffer data volume at the beginning of transfer of the next frame. Also, Rmax can be set at a value sufficiently larger than the bandwidth of the network.

Referring back to the flow chart in FIG. 15, the calculations of Rsend and R2send correspond to the processing in step S1223, and the calculation results are supplied to the data transmitter 1001-12 to designate the transmission bit rate of the next frame and subsequent frames and that for the frame which is being transmitted (step S1224). Then, FT and FT2 mentioned above are calculated. These calculations correspond to step S1225. The calculation results are supplied to the video data generator 1001-11 to set the video frame capture timing (step S1226). After that, the rate adjuster 1001-13 waits for the receiver report, and repeats the processing in steps S1221 to S1226.

Figure 16:
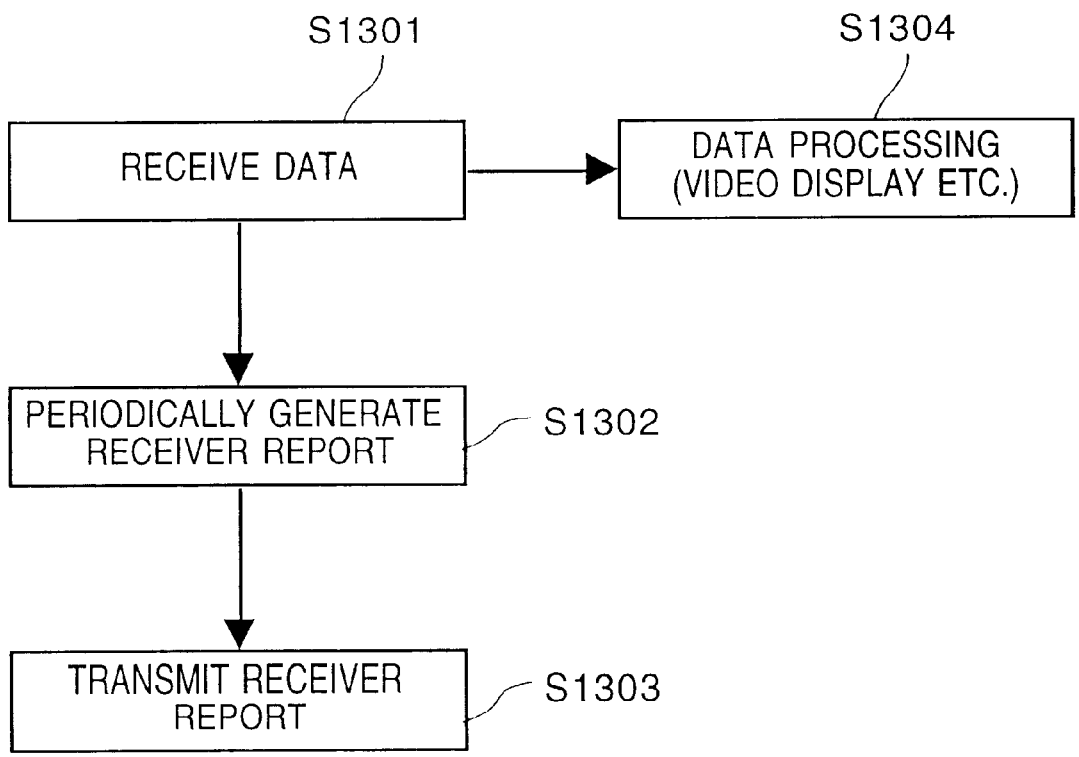
FIG. 16 is a flow chart showing the operation processing sequence on the receiving side in the fifth embodiment.

The processing of the receiving terminal 1001-2 will be explained below with reference to FIG. 16.

Data transmitted via the network are received by the data receiver 1001-21 (step S1301). The received data are processed by the data processor 1001-22 (step S1304). For example, when video data is received, an image is displayed, and so forth. The data reception time, data volume, and reception sequence number are sent to the receiver report generator 1001-23. Based on such information, a receiver report is generated every time the last packet of one frame is received (step S1302). Hence, receiver reports are not generated for all the received packets but a receiver report including the sequence number and reception rate for the latest data of received packets for one frame is generated. The generated receiver report is transmitted to the receiver report receiver 1001-15 of the transmitting terminal 1001-1 via the network (step S1303). An example of the format of the receiver report is as shown in FIG. 5, as described above.

By repeating the above-mentioned steps, the receiving terminal periodically transmits receiver report to the transmitting terminal while transmitting/receiving data between the transmitting and receiving terminals.

On the other hand, since the transmitting terminal transmits data to save data by the target buffer data volume by changing the network buffer data volume based on the receiver report, as shown in FIG. 17, the data can be transmitted without competition with other traffic sufficiently using an available transmission band. At the beginning of transmission of a new video frame, since the data saved in the buffer becomes zero, any delay for each video frame can be minimized.

As described above, according to the fifth embodiment, the transmission rate is adjusted so that the data volume (network buffer data volume) which has been output from the transmitting terminal onto the network but has not reached the receiving terminal yet matches a target value of the maximum buffer volume upon completion of transmission of one video frame, and matches a minimum value at the beginning of transmission of the next video frame. With this control, since data is transmitted to be saved in the route of the network to some extent, an available transmission band can be sufficiently used, and a transmission delay can be minimized in units of video frames.

In the fifth embodiment, a camera server (an apparatus which has a camera and provides a service for transferring capture video data to a client) has been exemplified as the transmitting terminal 1001-1. However, as can be understood from the above embodiment, the transmitting terminal need not always be the camera server, and the present invention may be applied to a case wherein video data stored in a predetermined storage medium is transferred to a client. Hence, the present invention is not limited to such specific arrangement.

To recapitulate, according to the fifth embodiment, video data can be efficiently transferred by appropriately adjusting the transfer rate of video data by sufficiently using the transmission band of the network.

Note that the present invention is not limited to specific apparatuses and methods that implement the first to fifth embodiment, but includes a case wherein the embodiments are achieved by supplying a program code of a software program that can realize the functions of the above-mentioned embodiments to a computer (or a CPU or MPU) of a system or apparatus, and controlling various devices by the computer of the system or apparatus in accordance with the program code.

In this case, the program code itself of software realizes the functions of the above-mentioned embodiments, and the program code itself and means for supplying the program code to the computer, more specifically, a storage medium which stores the program code are included in the scope of the present invention.

In the above embodiment, communications between two end terminals have been exemplified. However, the present invention is not limited to such specific communications but may be applied to communications among three or more terminals.

As the storage medium that stores the program code, for example, a floppy disk, hard disk, optical disk, magneto-optical disk, CD-ROM, CD-R, magnetic tape, nonvolatile memory card ROM, and the like may be used.

When the functions of the above-mentioned embodiments are realized not only by controlling various devices by the computer in accordance with the supplied program code alone but also by the program code in cooperation with an OS (operating system) running on the computer or another application software, such program code is included in the scope of the present invention.

Furthermore, the present invention also includes a case wherein the functions of the above-mentioned embodiments are realized by some or all of actual processing operations executed by a CPU or the like arranged in a function extension board or a function extension unit, which is inserted in or connected to the computer, after the supplied program code is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus for transferring data to a terminal via a network, comprising:

detection means for detecting information related to a total volume of data buffered between the data communication apparatus and the terminal on the network in which a plurality of relay apparatuses having a buffer are included, wherein said detection is based on reception information reported from the terminal, said reception information including information identifying which transferred data had been received by the terminal;

means for obtaining a transfer rare so that a detection result of said detection means converges to a predetermined target volume, said detection result including information reined to said total volume of data buffered by the plurality of relay apparatuses on said network; and transfer means for transferring the data in accordance with the obtained transfer rate.

2. The apparatus according to claim 1, wherein said transfer means transfers the data by adding, to each unit of data to be transferred, identification information for specifying the unit.

3. The apparatus according to claim 2, wherein the terminal sends back information including the identification information in received data.

4. The apparatus according to claim 3. wherein said detection means detects the information related to the volume of data buffered on the network by detecting replay information including the identification information included in data sent back from the terminal.

5. The apparatus according to claim 2, wherein the identification information is sequence number information.

6. The apparatus according to claim 1, wherein said detection means detects said information related to said volume of data on the network having a plurality of nodes.

7. The data communication apparatus according to claim 1, wherein said reception information from the terminal includes a reception rate information.

8. A data communication system built by a server for transmitting information, and a client for receiving data from said server via a network, said server comprising:

detection means for detecting information related to a total volume of data buffered between the sever and the client on said network in which a plurality of relay apparatuses having a buffer are included, wherein said detection is based on reception information reported from the client, said reception information including information identifying which transferred data bad been received by the client;

means for obtaining a transfer rate so that a detection result of said detection means converges to a predetermined target volume; and transfer means for transferring the data in accordance with the obtained transfer rate, and said client comprising:

means for extracting identification information from data transmitted by said server and sending back data including the identification information.

9. The data communication apparatus according to claim 8, wherein said reception information from the client includes a reception rate information.

10. A storage medium which stores a program serving as a data communication apparatus for transferring data to a terminal via a network, said storage medium storing program codes respectively Sewing as:

detection means for detecting information related to a total volume of data buffered between the data communication apparatus and the terminal on the network in which a plurality of relay apparatuses having a buffer are included, wherein said detection is based on reception information reported from the terminal, said reception information including information identifying which transferred data had been received by the terminal;

means for obtaining a transfer rate so that a detection result of said detection means converges to a predetermined target volume, said detection result including information related to said total volume of data buffered by the plurality of relay apparatuses on said network; and transfer means for transferring the data in accordance with the obtained transfer rate.

11. The apparatus according to claim 10, wherein said detection means detects said information related to said volume of data on the network having a plurality of nodes.

12. The data communication apparatus according to claim 10, wherein said reception information from the terminal includes a reception rate information.

13. A data communication apparatus for transferring data to a terminal via a network, comprising:
measurement means for measuring a data transfer time between itself and the terminal;
detection means for detecting information related to a total volume of data buffered between the data communication apparatus and the terminal on the network in which a plurality of relay apparatuses having a buffer are included, wherein said detection is based on the data transfer time measured by said measurement means, and is also based on reception information reported from the terminal, said reception information including information identifying which transferred data had been received by the terminal;
means for obtaining a transfer rate so that a detection result of said detection means converges to a predetermined target volume, said detection result including information related to said total volume of data buffered by the plurality of relay apparatuses on said network; and
transfer means for transferring the data in accordance with the obtained transfer rate.

14. The apparatus according to claim 13, wherein said transfer means transfers the data by adding, to each unit of data to be transferred, transmission time information of the unit.

15. The apparatus according to claim 14, wherein the terminal sends back receiver report information including the transmission rime information included in the received data, and processing time information required inside the terminal after the data s received.

16. The apparatus according to claim 15, wherein the receiver report information is sent back at a predetermined transmission time interval asynchronous with reception of data.

17. The apparatus according to claim 15, wherein said measurement means calculates a required round-trip time of a data communication on the basis of a reception time of the receiver report information from the terminal and the transmission time information and the processing rime information included in the receiver report information.

18. The apparatus according to claim 13, wherein said means for obtaining the transfer rate, includes:
calculation means for calculating the volume of data buffered on the network on the basis of the data transmission rune measured by said measurement means; and
correction means for correcting the transfer rate on the basis of a difference between the calculated volume of data buffered on the network and a predetermined target value.

19. The apparatus according to claim 18, wherein said correction means corrects the transfer rate to decrease the difference from the target value.

20. The apparatus according to claim 19, wherein the target value is set in accordance with a transmission band of the network.

21. The apparatus according to claim 19, wherein the data transmitted to the terminal is video data sensed by predetermined image sensing means.

22. The apparatus according to claim 13, wherein the network is a network complying with an RTP standardized by RFC1889.

23. The data communication apparatus according to claim 13, wherein said reception information from the terminal includes a reception rate information.

24. A data communication method for transferring data to a terminal via a network, comprising:
measuring a data transfer time between a source apparatus and the terminal;
detecting information related to a total volume of data buffered between the source apparatus and the terminal on the network in which a plurality of relay apparatuses having a buffer are included, wherein said detection is based on the data transfer time measured in the measurement step, and is also based on reception information reported from the terminal, said reception information including information identifying which transferred data had been received by the terminal;
the step of obtaining a transfer rate so that a detection result in the detection step converges to a predetermined target volume, said detection result including information related to said total volume of data buffered by the plurality of relay apparatuses on said network; and
transferring the data in accordance with the obtained transfer rate.

25. The data communication apparatus according to claim 24, wherein said reception information from the terminal includes a reception rate information.

26. A storage medium which stores a program code serving as a data communication apparatus for transferring data to a terminal via a network, said storage medium storing program codes respectively serving as:
measurement means for measuring a data transfer time between itself and the terminal;
detection means for detecting information related to a total volume of data buffered between the data communication apparatus and the terminal on the network in which a plurality of relay apparatuses having a buffer are included, wherein said detection is based on the data transfer time measured by said measurement means, and is also based on reception information reported from the terminal, said reception information including information identifying which transferred data had been received by the terminal;
means for obtaining a transfer rate so that a detection result of said detection means converges to a predetermined target volume, said detection result including information related to said total volume of data buffered byte plurality of relay apparatuses on said network; and
transfer means for transferring the data in accordance with the obtained transfer rate.

27. The data communication apparatus according to claim 26, wherein said reception information from the terminal includes a reception rate information.

28. A data communication system built by a transmitting apparatus for transmitting data via a network, and a receiving apparatus for receiving the data, said transmitting apparatus comprising:
measurement means for measuring a data transfer rime between itself and said receiving apparatus;
detection means for detecting information related to a total volume of data buffered between the transmitting apparatus and the receiving apparatus on the network in which a plurality of relay apparatuses having a buffer are included, wherein said detection is based on the data transfer time measured by said measurement means, and is also based on reception information reported from the receiving apparatus, said reception information including information identifying which transferred data had been received by the receiving apparatus;

means for obtaining a transfer rate so that a detection result of said detection means converges to a predetermined target volume, said detection result including information related to said total volume of data buffered byte plurality of relay apparatuses on said network; and transfer means for transferring the data in accordance with the obtained transfer rate, and said receiving apparatus comprising:

receiving means for receiving data from said transmitting apparatus; and reply means for generating information for helping measurement of said measurement means based on the data received by said receiving means, and sending hack the information to said transmitting apparatus.

29. The system according to claim 28, wherein said transfer means transfers the data by adding, to each unit of data to be transferred, transmission rime information of the unit, and said reply means generates information including the transmission rime information included in the data received by said receiving means, and time information required for a reply, and sends back the information.

30. The data communication apparatus according to claim 28, wherein said reception information from the receiving apparatus includes a reception rate information.

31. A data communication method for transferring data to a terminal via a network, comprising the steps of:

detecting information relaxed to a total volume of data buffered between the data communication apparatus and the terminal on the network in which a plurality of relay apparatuses having a buffer are included, wherein said dejection is based on reception information reported from the terminal, said reception information including information identifying which transferred data had been received by the terminal;

obtaining a transfer raze so that a detection result of said detecting step converges to a predetermined target volume, said detection result including information related to said total volume of data buffered by the plurality of relay apparatuses on said network; and transferring the data in accordance with the obtained transfer rate.

32. The data communication apparatus according to claim 31, wherein said reception information from the terminal includes a reception rate information.

* * * * *